UNITED STATES PATENT OFFICE.

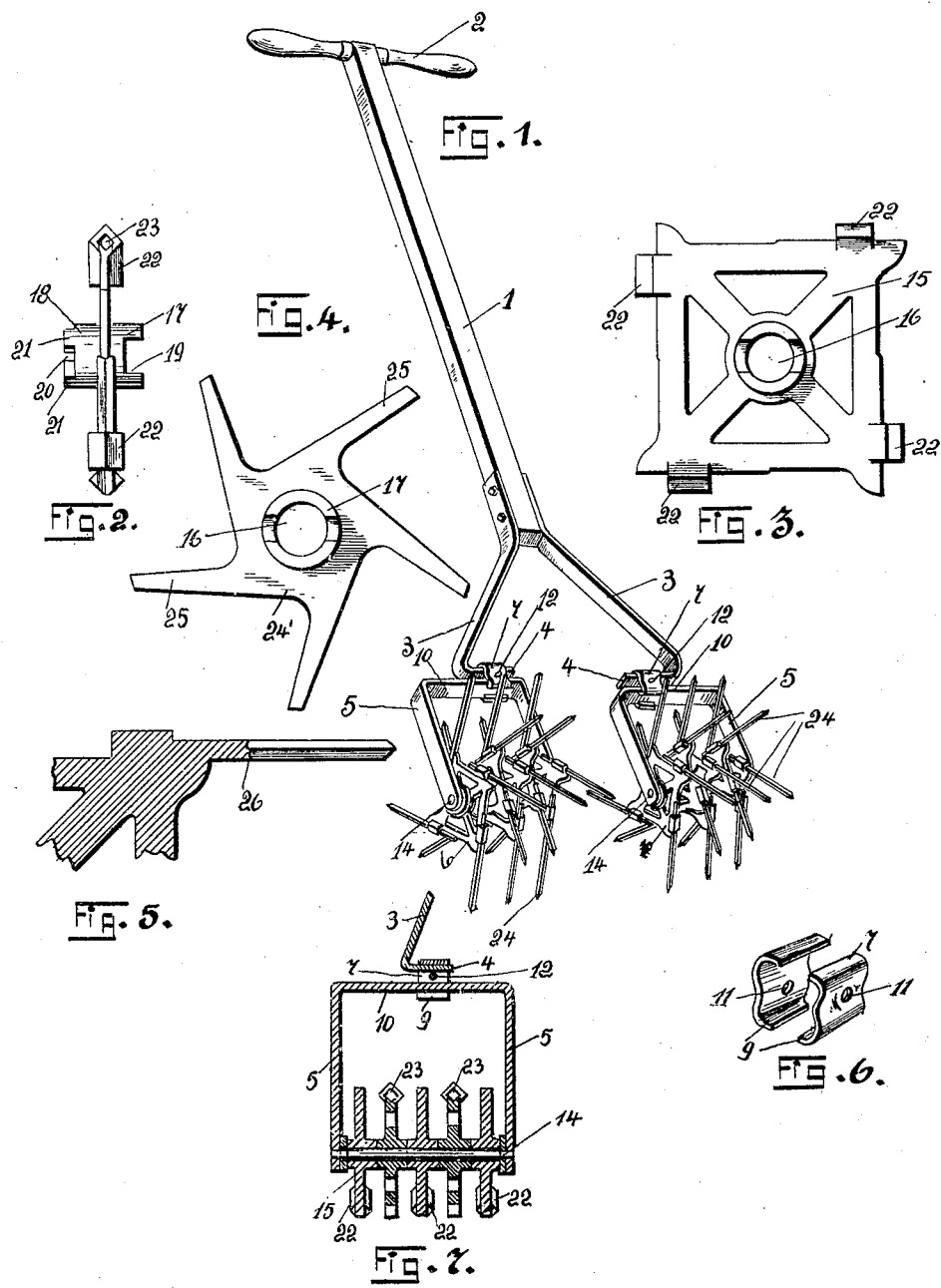

WILLIAM NEWBY, OF PITTSBURG, PENNSYLVANIA, ASSIGNOR TO THE NEW IDEA IMPLEMENT COMPANY, OF PITTSBURG, PENNSYLVANIA, A COPARTNERSHIP.

CULTIVATOR.

No. 807,395.     Specification of Letters Patent.     Patented Dec. 12, 1905.

Application filed January 11, 1905. Serial No. 240,610.

*To all whom it may concern:*

Be it known that I, WILLIAM NEWBY, a citizen of the United States of America, residing at Pittsburg, in the county of Allegheny and State of Pennsylvania, have invented certain new and useful Improvements in Cultivators, of which the following is a specification, reference being had therein to the accompanying drawings.

This invention relates to certain new and useful improvements in cultivators, and more particularly to that type of implement which is manually operated.

The cultivator as constructed by me is a radical departure in construction and principle of operation from the cultivators heretofore used; and the primary object of my improved implement is to provide a cultivator which is adapted to break and pulverize the soil to a uniform depth, leaving the ground level without ridges or furrows and putting the soil into the best possible condition for seeding or planting purposes.

Another object of this invention is to provide a machine or cultivator that is exceedingly compact in form and can be readily used in preparing land for seeding purposes, working the surface of the soil when the same has become compact, and for working over flower-beds and lawns where it is desired to renovate or place the soil in such a condition that a thorough aeration of the soil is permitted.

Briefly described, my improved implement comprises a machine which is adapted to be manually operated, and the machine proper consists of what will be hereinafter termed a "cylinder," this cylinder comprising a plurality of disks having teeth, which as the machine is pushed forward are pushed into the ground. As the machine moves forward the teeth move backward, then forward, and other teeth came into action. Each tooth when in the soil acts as a lever, and it is this leverage principle that permits of the easy working of my improved implement. The cultivator as constructed by me may be formed of one cylinder or two, and these cylinders are made adjustable, whereby the implement can easily and quickly be adjusted to straddle a row.

The above construction will be hereinafter more fully described and then more specifically pointed out in the claims, and, referring to the drawings accompanying this application, like numerals of reference designate corresponding parts throughout the several views, in which—

Figure 1 is a perspective view of my improved cultivator. Fig. 2 is an edge view of one form of disk, a plurality of which comprise a cylinder of my improved implement. Fig. 3 is a side elevation of the same. Fig. 4 is a side elevation of another form of disk which may be employed in connection with my improved implement. Fig. 5 is a detail sectional view of a portion of one of the disks. Fig. 6 is a detail perspective view of one set of the clamping members of my improved implement; and Fig. 7 is a vertical sectional view of one of the cylinder-supporting brackets, illustrating a cylinder mounted therein.

By referring to the accompanying drawings it will be observed that my improved implement is constructed upon the principle of a hand mower or machine that is to be pushed forward. The reference-numeral 1 designates a bar, to the upper end of which is connected a cross-handle 2 and to the lower end of which are connected angle-bars 3 3, having inwardly-extending ends 4 4. Upon the ends 4 of the bars 3 are mounted supporting-brackets 5 5, and in these brackets are rotatably mounted angular frames 6 6.

The angular frames 6 and the brackets 5 are adjustably connected to the ends 4 of the bars 3 by clamping members 7 7. These clamping members are substantially channel shape, whereby they may be securely clamped to the ends of the bars 3 and the top 10 of the brackets 5 5. The clamping members are provided with apertures 11 11, through which bolts 12 pass. By applying bolts with suitable nuts the clamping members may be forced together to hold said brackets in any position to which they may be moved within the clamping members. In Fig. 1 of the drawings I have illustrated the brackets 5 5 as being separated; but it will of course be understood that these brackets can be moved inwardly in close proximity to one another.

In the ends of the brackets 5 5 are mounted rods 14 14, which serve functionally as spindles for the frames 6 6. Each cylinder—that is, each set of frames—comprises a plurality of frames 6, and by referring to Figs. 2 to 5, inclusive, the construction of these frames will be readily apparent.

In Fig. 2 of the drawings I have illustrated one form, which consists of a rectangular frame having a central opening 16, and surrounding said opening upon each side of the frame are collars 17 and 18. The collar 17 is slotted, as indicated at 19, while the collar 18 is cut away, as indicated at 20, forming lugs 21 21. The lugs 21 21 are made of such a size that they will fit into the slots 19 of the collar 17, carried by the disk adjoining or located at the side. By constructing the collars 17 and 18 of the disk in the manner just described I am enabled to mount a plurality of frames upon a spindle, whereby they will be interlocked and will practically serve as though the frames were one complete cylinder or integral with one another.

The edges of the rectangular frame adjacent to the corners thereof are provided with lugs 22, having openings 23 formed therein, in which are mounted teeth or tines 24. By referring to Figs. 1 and 3 of the drawings it will be observed that the teeth of each frame project tangentially therefrom and that a forward movement of the cultivator causes the teeth to move rearwardly through the soil over which the cultivator is operating, and as each tooth or tine passes out of the soil the succeeding tooth enters the soil, causing the soil to be thoroughly agitated or disintegrated.

In Fig. 4 of the drawings I have illustrated a substantially star-shaped wheel, which may be employed in lieu of the rectangular frames which carry detachable teeth or tines. The wheel, as designated by the reference-numeral 24', carries integral teeth or tines 25, which are tangentially disposed similar to the teeth or tines carried by the frames. The wheel 24' is also provided with collars 17 and 18, similar to the collars illustrated in Fig. 2 of the drawings. It will also be observed that the rectangular frame illustrated in Figs. 3 and 7 of the drawings may be formed with integral teeth or tines 26. (See Fig. 5.)

By the construction of the cylinders it will be observed that the teeth or tines of my improved implement will enter the soil or ground and thoroughly pulverize or disintegrate the soil without forming ridges or furrows, causing the soil to be thoroughly broken and opened, permitting thorough aeration of the soil, conserving the moisture in the subsoil, and placing the land in such a condition that water may easily pass into the same. The cultivator is also adapted to be used in wet seasons, on account of the fact that the teeth or tines of the implement will raise and break the land to such an extent as to permit air to enter the same and dry out the ground after a continued wet spell.

While I have herein described the main advantages of my improved implement, together with the detail construction thereof, it is obvious that my improved implement or cultivator can be readily used for numerous other purposes, which will be apparent to those skilled in handling cultivators. It is obvious that a suitable attachment may be placed on the implement whereby a horse could be hitched to the implement, and while I have herein shown the preferred manner of constructing the same I do not care to limit myself to the above construction, but may make various changes without departing from the general spirit and scope of the invention.

What I claim, and desire to secure by Letters Patent, is—

1. An implement of the character described comprising a bar, a handle carried by said bar, a plurality of angle-bars attached to said bar, a U-shaped bracket adjustably secured to each of said angle-bars, a plurality of substantially rectangular interlocking frames journaled in said brackets, said frames having their flat edges in staggered relation, and a plurality of straight teeth carried by each frame, said teeth being arranged in alinement with the straight edges of the frame.

2. A manually-operable implement of the character described comprising a bar having a handle, a plurality of brackets carried by said bar, a plurality of substantially rectangular interlocking frames journaled in said brackets, each frame being provided with a plurality of straight tangentially-extending teeth, the teeth on certain of said frames being in staggered relation to the teeth on the other frames.

3. A manually-operated implement of the character described comprising a bracket, a bar on which the bracket is mounted, a handle carried by said bar, a plurality of substantially rectangular frames rotatably mounted in said bracket, each frame being provided with a plurality of straight tangentially-disposed teeth, said frames being provided with means whereby they may be adjusted relatively to one another, and locked in adjusted position, with the teeth of one frame in staggered relation to the teeth of the other frame.

4. In a cultivator the combination with supporting-brackets, of cylinders supported by said brackets, each cylinder consisting of a plurality of frames, each frame being provided with a plurality of straight tangentially-disposed detachable teeth.

5. In a cultivator, the combination with a suitable bracket, of a cylinder mounted in said bracket, said cylinder consisting of a plurality of interlocking frames, tangentially-disposed straight teeth carried by each frame.

In testimony whereof I affix my signature in the presence of two witnesses.

WILLIAM NEWBY.

Witnesses:
WILLIAM C. DICKEN,
JOSEPH BONISTALL.